(12) United States Patent
Seregin et al.

(10) Patent No.: US 9,380,307 B2
(45) Date of Patent: Jun. 28, 2016

(54) METHOD AND SYSTEM FOR INTRA BASE LAYER (BL) TRANSFORM IN VIDEO CODING

(71) Applicant: QUALCOMM Incorporated, San Diego, CA (US)

(72) Inventors: Vadim Seregin, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 206 days.

(21) Appl. No.: 14/080,330

(22) Filed: Nov. 14, 2013

(65) Prior Publication Data

US 2014/0140393 A1    May 22, 2014

Related U.S. Application Data

(60) Provisional application No. 61/728,180, filed on Nov. 19, 2012.

(51) Int. Cl.
*H04N 19/12* (2014.01)
*H04N 19/124* (2014.01)
(Continued)

(52) U.S. Cl.
CPC ............. *H04N 19/12* (2014.11); *H04N 19/124* (2014.11); *H04N 19/134* (2014.11);
(Continued)

(58) Field of Classification Search
CPC ... H04N 19/12; H04N 19/124; H04N 19/134; H04N 19/136; H04N 19/159; H04N 19/174; H04N 19/176; H04N 19/186
USPC ........................................................ 375/240.2
See application file for complete search history.

(56) References Cited

U.S. PATENT DOCUMENTS 8,432,968 B2    4/2013   Ye et al.
2006/0233250 A1   10/2006   Cha et al.
(Continued)

FOREIGN PATENT DOCUMENTS

EP    1388815 A2    2/2004
TW    I339072       3/2011
(Continued)

OTHER PUBLICATIONS

Chen J., et al., "Description of Scalable Video coding Technology Proposal by Qualcomm (Configuration 2)", 11. JCT-VC Meeting; 102. MPEG Meeting Oct. 10, 2012-Oct. 19, 2012; Shanghai; (Joint Collaborative Team on Video Coding of ISO/IEC JTC1/SC29/WG11 and ITU-T SG.16); < URL: http://wftp3.itu.int/av-arch/jctvc-site/no.jvtcv-k0036 >, Oct. 2, 2012, XP030112968, pp. 1-22.
(Continued)

*Primary Examiner* — William C Vaughn, Jr.
*Assistant Examiner* — Jae N Noh
(74) *Attorney, Agent, or Firm* — Knobbe, Martens, Olson & Bear, LLP

(57) ABSTRACT

An apparatus for coding video information according to certain aspects includes a memory unit and a processor in communication with the memory unit. The memory unit is configured to store video information associated with a base layer and an enhancement layer. The processor is configured to, in response to determining that the video information associated with the enhancement layer is to be determined based upon the video information associated with the base layer, select between a first transform and a second transform based at least in part on at least one of a transform unit (TU) size and a color component type of the enhancement layer video information.

25 Claims, 5 Drawing Sheets

(51) Int. Cl.
*H04N 19/159* (2014.01)
*H04N 19/176* (2014.01)
*H04N 19/30* (2014.01)
*H04N 19/134* (2014.01)
*H04N 19/136* (2014.01)
*H04N 19/186* (2014.01)
*H04N 19/174* (2014.01)
*H04N 19/187* (2014.01)

(52) U.S. Cl.
CPC .......... *H04N 19/136* (2014.11); *H04N 19/159* (2014.11); *H04N 19/174* (2014.11); *H04N 19/176* (2014.11); *H04N 19/186* (2014.11); *H04N 19/187* (2014.11); *H04N 19/30* (2014.11)

(56) References Cited

U.S. PATENT DOCUMENTS

| | | | |
|---|---|---|---|
| 2007/0086520 A1 | 4/2007 | Kim | |
| 2009/0097548 A1 | 4/2009 | Karczewicz et al. | |
| 2013/0003847 A1* | 1/2013 | Hong | H04N 19/52 375/240.16 |
| 2013/0194384 A1 | 8/2013 | Hannuksela | |
| 2014/0086316 A1* | 3/2014 | Kerofsky | H04N 19/70 375/240.12 |
| 2014/0119440 A1* | 5/2014 | Lee | H04N 19/503 375/240.12 |
| 2014/0247868 A1* | 9/2014 | Oh | H04N 19/00024 375/240.03 |
| 2015/0296211 A1* | 10/2015 | Chuang et al. | H04N 19/30 375/240.12 |

FOREIGN PATENT DOCUMENTS

| | | |
|---|---|---|
| TW | I370690 | 8/2012 |
| WO | WO-2014031544 | 2/2014 |

OTHER PUBLICATIONS

Guo L., et al., "Transform Selection for Inter-Layer Texture Prediction in Scalable Video Coding", 11.JCT-VC Meeting; 102.MPEG Meeting; Oct. 10, 2012-Oct. 19, 2012; Shanghai; (Joint Collaborative Team on Video Coding of ISO/IEC JTC1/SC29/WG11 and ITU-T SG.16); URL: http://wftp3.itu.int/av-arch/jctvc-site/,, No. JCTVC-K0321, Oct. 7, 2012, XP030113203; 3 pages.

International Search Report and Written Opinion—PCT/US2013/070377—ISAEPO—Jan. 28, 2014.

Sullivan G.J., et al., "Overview of the High Efficiency Video Coding (HEVC) Standard", IEEE Transactions on Circuits and Systems for Video Technology, Sep. 28, 2012, pp. 1-19, XP55045358, ISSN: 1051-8215, DOI:10.1109/TCSVT.2012.2221191.

Yeo C., et al., "On transform selection for IntraBL mode in SHVC", 103. MPEG Meeting; Jan. 21, 2013-Jan. 25, 2013; Geneva; (Motion Picture Expert Group or ISO/IEC JTC1/SC29/WG11), No. m27395, Jan. 12, 2013, XP030055965.

Taiwan Search Report—TW102142123—TIPO—Oct. 5, 2015.

\* cited by examiner

METHOD AND SYSTEM FOR INTRA BASE LAYER (BL) TRANSFORM IN VIDEO CODING

CROSS REFERENCE TO RELATED APPLICATIONS

This application claims priority to U.S. Provisional No. 61/728,180, filed Nov. 19, 2012, which is incorporated by reference in its entirety.

BACKGROUND

1. Field

This disclosure is related to scalable video coding (SVC), multi-view video coding (MVC), and 3D video coding (3DV).

2. Description of the Related Art

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

Residual data may be transformed from the pixel domain to the transform domain using a variety of transforms. However, current techniques do not allow transform selection based upon the characteristics of the data to transform.

SUMMARY OF THE DISCLOSURE

In general, this disclosure describes techniques related to scalable video coding (SVC). The techniques described below allow selection of a particular transform type based upon characteristics of the video information being transformed when the video information is to be encoded or decoded using an intra-layer prediction mode.

Efficiently using available cores. Coding efficiency. Could sacrifice efficiency to simplify the implementation, i.e., the core is available.

First of all the different transform types such as DCT or DST might be applied to code a block. For example, in HEVC standard, DCT and DST are used to code intra-predicted luma block. However in the SVC extension, one more type of prediction can be used such inter-layer intra prediction, and for this new mode transform selection has to be defined. The approaches for such a selection are described in the invention, including one method that does not require a new core or other low-level changes to HEVC processes.

In one embodiment, an apparatus for coding video information includes a memory unit and a processor. The memory unit is configured to store video information associated with a base layer and an enhancement layer. The processor is operationally coupled to the memory and configured to, in response to determining that the video information associated with the enhancement layer is to be determined based upon the video information associated with the base layer, select between a first transform and a second transform based at least in part on at least one of a transform unit (TU) size and a color component type of the enhancement layer video information.

In another embodiment, a method of decoding video information includes receiving video information associated with a base layer and an enhancement layer. The method also includes determining whether the video information associated with the enhancement layer is to be determined based upon the video information associated with the base layer. The method also includes, in response to determining that the video information associated with the enhancement layer is to be determined based upon the video information associated with the base layer, selecting between a first transform and a second transform based at least in part on at least one of a transform unit (TU) size and a color component type of the enhancement layer video information. The method also includes decoding the video information associated with the enhancement layer using the selected transform.

In yet another embodiment, a method of encoding video information includes receiving video information associated with a base layer and an enhancement layer. The method also includes determining whether the video information associated with the enhancement layer is to be determined based upon the video information associated with the base layer. The method also includes, in response to determining that the video information associated with the enhancement layer is to be determined based upon the video information associated with the base layer, selecting between a first transform and a second transform based at least in part on at least one of a transform unit (TU) size and a color component type of the enhancement layer video information. The method also includes encoding the video information associated with the enhancement layer using the selected transform.

In yet another embodiment, a non-transitory computer readable medium includes code that, when executed, causes an apparatus to receive video information associated with a base layer and an enhancement layer. The instructions also causes the apparatus to select between a first transform and a second transform based at least in part on at least one of a transform unit (TU) size and a color component type of the enhancement layer video information when the video information associated with the enhancement layer is to be determined based upon the video information associated with the base layer. The instructions also cause the apparatus to code the video information associated with the enhancement layer using the selected transform.

In yet another embodiment, an apparatus configured to code video information includes means for receiving video information associated with a base layer and an enhancement layer. The apparatus also includes means for determining whether the video information associated with the enhancement layer is to be determined based upon the video information associated with the base layer. The apparatus also includes means for selecting between a first transform and a second transform based at least in part on at least one of a transform unit (TU) size and a color component type of the enhancement layer video information in response to determining that the video information associated with the enhancement layer is to be determined based upon the video information associated with the base layer. The apparatus also includes means for coding the video information associated with the enhancement layer using the selected transform.

The details of one or more examples are set forth in the accompanying drawings and the description below, which are not intended to limit the full scope of the inventive concepts described herein. Other features, objects, and advantages will be apparent from the description and drawings, and from the claims.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION OF SPECIFIC EMBODIMENTS

Figure 1:
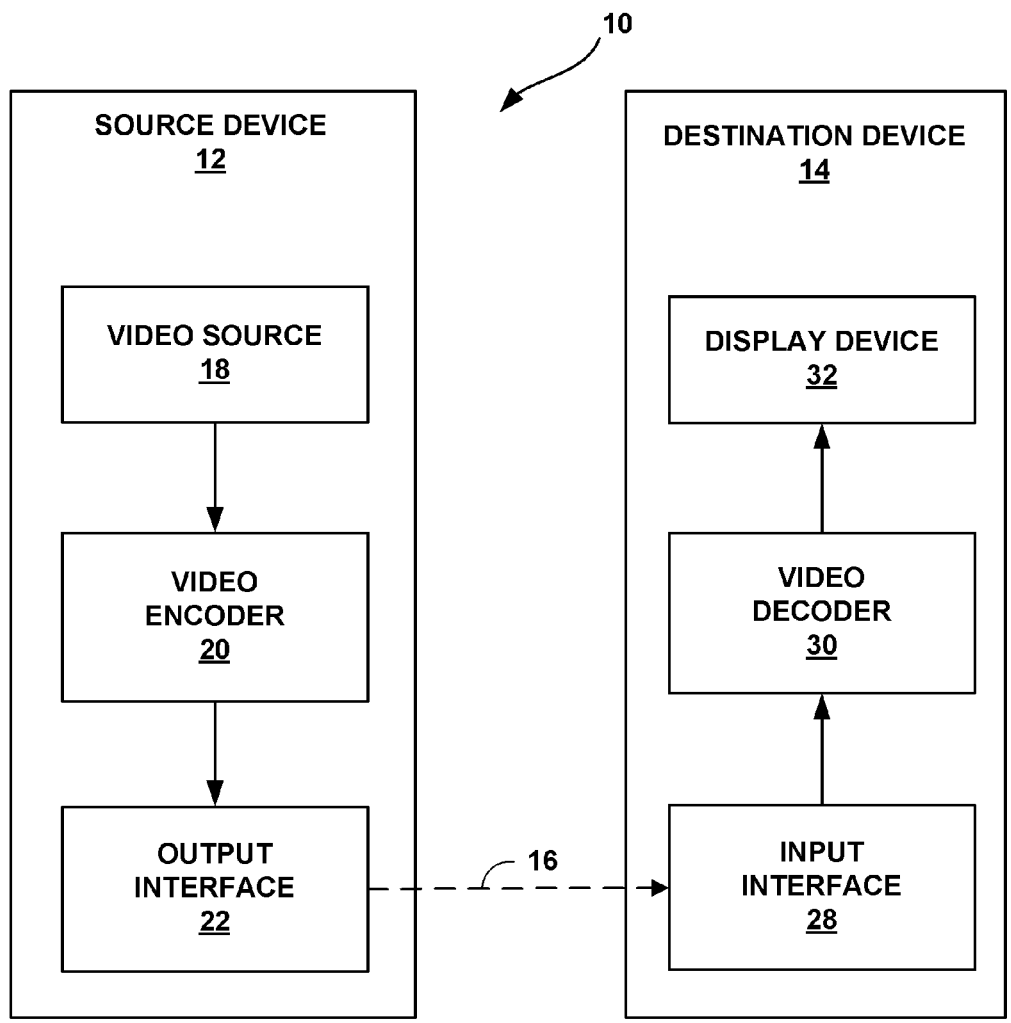
FIG. 1 is a block diagram illustrating an example video encoding and decoding system that may utilize techniques in accordance with aspects described in this disclosure.

The techniques described in this disclosure generally relate to scalable video coding (SVC) and multiview/3D video coding. For example, the techniques may be related to, and used with or within, a High Efficiency Video Coding (HEVC) scalable video coding (SVC, sometimes referred to as SHVC) extension. In an SVC extension, there could be multiple layers of video information. The layer at the very bottom level may serve as a base layer (BL), and the layer at the very top (or the highest layer) may serve as an enhanced layer (EL). The "enhanced layer" is sometimes referred to as an "enhancement layer," and these terms may be used interchangeably. The base layer is sometimes referred to as a "reference layer," (RL) and these terms may also be used interchangeably. All layers in between the base layer and the top layer may serve as either or both ELs or reference layers (RLs). For example, a layer in the middle may be an EL for the layers below it, such as the base layer or any intervening enhancement layers, and at the same time serve as a RL for the enhancement layers above it. Each layer in between the base layer and the top layer (or the highest layer) is may be used as a reference for inter-layer prediction by a higher layer and may use a lower layer as a reference for inter-layer prediction.

For purposes of illustration only, the techniques described in the disclosure are described with examples including only two layers (e.g., lower level layer such as the base layer, and a higher level layer such as the enhanced layer). It should be understood that the examples described in this disclosure can be extended to examples with multiple base layers and enhancement layers as well. In addition, for ease of explanation, the following disclosure mainly uses the terms "frames" or "blocks." However, these terms are not meant to be limiting. For example, the techniques described below can be used with different video units, such as blocks (e.g., CU, PU, TU, macroblocks, etc.), slices, frames, etc.

Video Coding

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. In addition, a new video coding standard, namely High Efficiency Video Coding (HEVC), is being developed by the Joint Collaboration Team on Video Coding (JCT-VC) of ITU-T Video Coding Experts Group (VCEG) and ISO/IEC Motion Picture Experts Group (MPEG). A recent draft of HEVC is available from http://wg11.sc29.org/jct/doc_end_user/current document.php?id=5885/JCTVC-I1003-v2, as of Jun. 7, 2012. Another recent draft of the HEVC standard, referred to as "HEVC Working Draft 7" is downloadable from http://phenix.it-sudparis.eu/jct/doc_end_user/documents/9_Geneva/wg11/JCTV C-I1003-v3.zip, as of Jun. 7, 2012. The full citation for the HEVC Working Draft 7 is document HCTVC-I1003, Bross et al., "High Efficiency Video Coding (HEVC) Text Specification Draft 7," Joint Collaborative Team on Video Coding (JCT-VC) of ITU-T SG16 WP3 and ISO/IEC JTC1/SC29/WG11, 9th Meeting: Geneva, Switzerland, Apr. 27, 2012 to May 7, 2012. Another recent draft, referred to as Working Draft 8, is available at The latest Working Draft (WD) of HEVC, and referred to as HEVC WD8 hereinafter, is available online at http://phenix.int-evey.fr/jct/doc_end_user/documents/10_Stockholm/wg11/JCTVC-J1003-v8.zip. Each of these references is incorporated by reference in its entirety.

Scalable video coding (SVC) may be used to provide quality (also referred to as signal-to-noise (SNR)) scalability, spatial scalability and/or temporal scalability. For example, in one embodiment, a reference layer (e.g., a base layer) includes video information sufficient to display a video at a first quality level and the enhancement layer includes additional video information relative to the reference layer such that the reference layer and the enhancement layer together include video information sufficient to display the video at a second quality level higher than the first level (e.g., less noise, greater resolution, better frame rate, etc.). An enhanced layer may have different spatial resolution than a base layer. For example, the spatial aspect ratio between EL and BL can be 1.0, 1.5, 2.0 or other different ratios. In other words, the spatial aspect of the EL may equal 1.0, 1.5, or 2.0 times the spatial aspect of the BL. In some examples, the scaling factor of the EL may be greater than the BL. For example, a size of pictures in the EL may be greater than a size of pictures in the BL. In this way, it may be possible, although not a limitation, that the spatial resolution of the EL is larger than the spatial resolution of the BL.

In the SVC extension for H.264, prediction of a current block may be performed using the different layers that are provided for SVC. Such prediction may be referred to as inter-layer prediction. Inter-layer prediction methods may be utilized in SVC in order to reduce inter-layer redundancy. Some examples of inter-layer prediction may include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion of the base layer to predict motion in the enhancement layer. Inter-layer residual prediction uses the residue of the base layer to predict the residue of the enhancement layer.

In some embodiments of inter-layer motion prediction, the motion data of the base layer (e.g., for the co-located block) may be used to predict the current block in the enhancement layer. For example, while coding a video unit in an enhancement layer, video coders can use information from a reference layer to obtain additional motion compensation data that can be used to identify additional hypotheses. As these additional hypotheses are implicitly derived from data already existing data in a video bitstream, additional performance in video coding can be gained with little or no additional cost in bitstream size. In another example, motion information from spatially neighboring video units can be used to locate additional hypothesis. The derived hypothesis can then be averaged or otherwise combined with explicitly encoded hypothesis to generate a better prediction of a value of a video unit.

In SVC, a mode referred to as Intra-BL (or Texture-BL) relates to a class of the modes where base layer reconstructed pixels are used as a prediction for a current enhancement layer block. This mode can be applied at a coding unit (CU) or prediction unit (PU) level. For example, a flag at the CU or PU level can be used to indicate whether such mode is to be used. In addition, as described below, residual data derived from the base layer using such mode is transformed as part of the video encoding and decoding process. However, current techniques do not allow for the selection of a particular transform based upon the characteristics of the data being transformed when utilizing a mode where base layer reconstructed pixels are used to predict a current enhancement layer block. Such techniques, as described in greater detail below, would enable better coding efficiency and reduced computational resources.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Video Coding System

FIG. 1 is a block diagram that illustrates an example video coding system 10 that may utilize techniques in accordance with aspects described in this disclosure. As used described herein, the term "video coder" refers generically to both video encoders and video decoders. In this disclosure, the terms "video coding" or "coding" may refer generically to video encoding and video decoding.

As shown in FIG. 1, video coding system 10 includes a source device 12 and a destination device 14. Source device 12 generates encoded video data. Destination device 14 may decode the encoded video data generated by source device 12. Source device 12 can provide the video data to the destination device 14 via a computer-readable medium 16. Source device 12 and destination device 14 may include a wide range of devices, including desktop computers, notebook (e.g., laptop) computers, tablet computers, set-top boxes, telephone handsets, such as so-called "smart" phones, so-called "smart" pads, televisions, cameras, display devices, digital media players, video gaming consoles, in-car computers, video streaming devices, or the like. Source device 12 and destination device 14 may be equipped for wireless communication.

Destination device 14 may receive the encoded video data to be decoded via computer-readable medium 16. Computer-readable medium 16 may comprise a type of medium or device capable of moving the encoded video data from source device 12 to destination device 14. For example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise a wireless or wired communication medium, such as a radio frequency (RF) spectrum or one or more physical transmission lines. The communication medium may form part of a packet-based network, such as a local area network, a wide-area network, or a global network, such as the Internet. The communication medium may include routers, switches, base stations, or other equipment that may be useful to facilitate communication from source device 12 to destination device 14.

In some embodiments, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or other digital storage media for storing video data. The storage device may correspond to a file server or another intermediate storage device that may store the encoded video generated by source device 12. Destination device 14 may access stored video data from the storage device via streaming or download. The file server may be a type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through a standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure can apply applications or settings in addition to wireless applications or settings. The techniques may be applied to video coding in support of a of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some embodiments, system 10 may be configured to support one-way or two-way video transmission to support applications such as video streaming, video playback, video broadcasting, and/or video telephony.

In FIG. 1, source device 12 includes video source 18, video encoder 20, and output interface 22. Destination device 14 includes input interface 28, video decoder 30, and display device 32. Video encoder 20 of source device 12 may be configured to apply the techniques for coding a bitstream including video data conforming to multiple standards or standard extensions. In other embodiments, a source device and a destination device may include other components or arrangements. For example, source device 12 may receive video data from an external video source 18, such as an external camera. Likewise, destination device 14 may interface with an external display device, rather than including an integrated display device.

Video source 18 of source device 12 may include a video capture device, such as a video camera, a video archive containing previously captured video, and/or a video feed interface to receive video from a video content provider. Video source 18 may generate computer graphics-based data as the source video, or a combination of live video, archived video, and computer-generated video. In some embodiments, if video source 18 is a video camera, source device 12 and destination device 14 may form so-called camera phones or video phones. The captured, pre-captured, or computer-generated video may be encoded by video encoder 20. The encoded video information may be output by output interface 22 to a computer-readable medium 16.

Computer-readable medium 16 may include transient media, such as a wireless broadcast or wired network transmission, or storage media (e.g., non-transitory storage media), such as a hard disk, flash drive, compact disc, digital video disc, Blu-ray disc, or other computer-readable media. A network server (not shown) may receive encoded video data from source device 12 and provide the encoded video data to destination device 14 (e.g., via network transmission). A computing device of a medium production facility, such as a disc stamping facility, may receive encoded video data from source device 12 and produce a disc containing the encoded video data. Therefore, computer-readable medium 16 may be understood to include one or more computer-readable media of various forms.

Input interface 28 of destination device 14 can receive information from computer-readable medium 16. The information of computer-readable medium 16 may include syntax information defined by video encoder 20, which can be used by video decoder 30, that includes syntax elements that describe characteristics and/or processing of blocks and other coded units, e.g., GOPs. Display device 32 displays the decoded video data to a user, and may include any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete sine transform (DST), a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

As discussed in greater detail below, the video encoder 20 or video decoder 30 may be configured to select a transform based upon one or more characteristics of the video being coded. For example, the transform may be selected based upon the transform unit size and video type (e.g., chroma, luma), among other characteristics. Methods of determining or selecting a transform that may be implemented by the video encoder 20 or decoder 30 are described in greater detail below, including, for example, with respect to FIGS. 4 and 5.

Following any transforms to produce transform coefficients, video encoder 20 may perform quantization of the transform coefficients. Quantization is a broad term intended to have its broadest ordinary meaning. In one embodiment, quantization refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

Video Encoder

Figure 2:
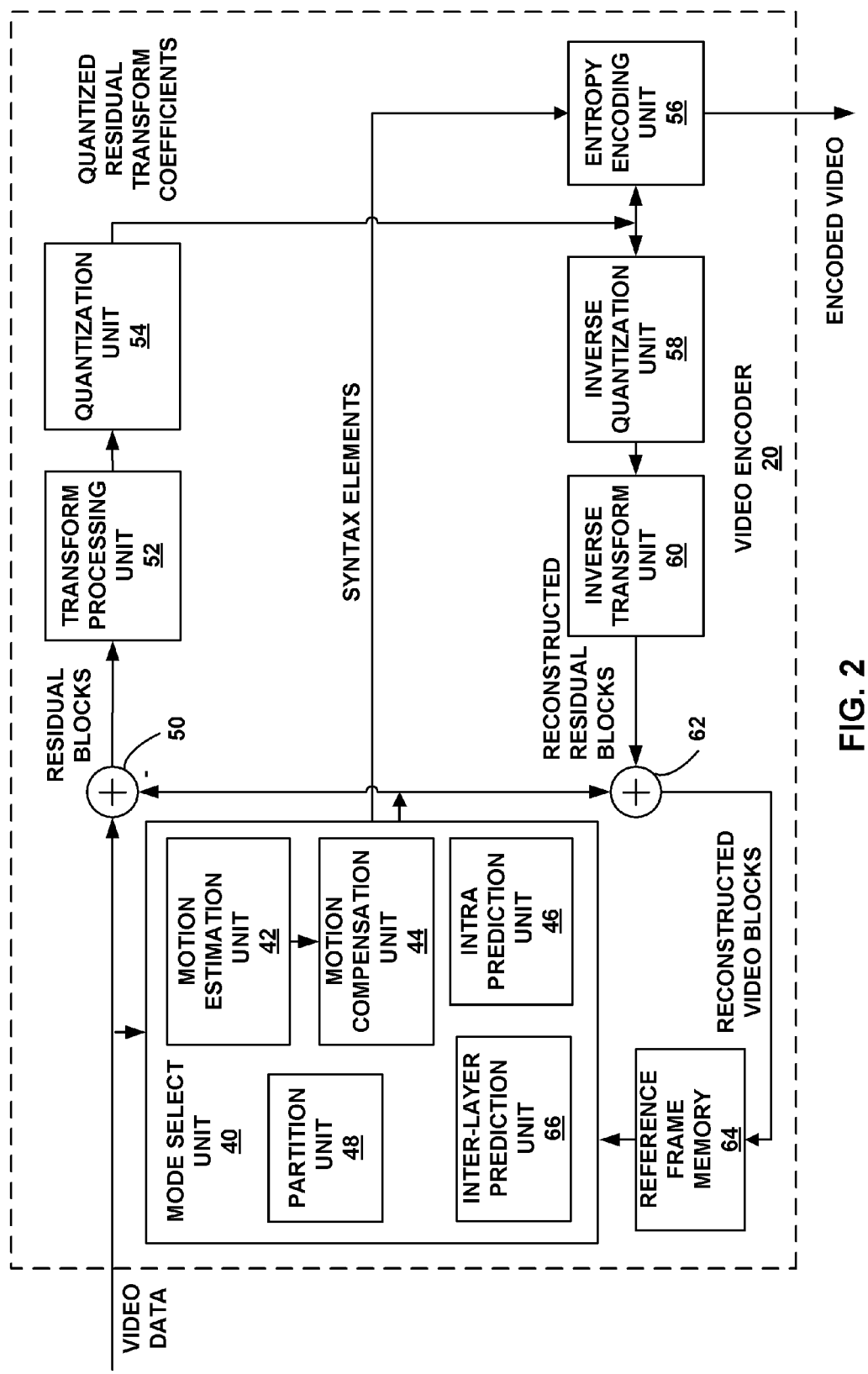
FIG. 2 is a block diagram illustrating an example of a video encoder that may implement techniques in accordance with aspects described in this disclosure.

FIG. 2 is a block diagram illustrating an example of a video encoder that may implement techniques in accordance with aspects described in this disclosure. Video encoder 20 may be configured to perform any or all of the techniques of this disclosure, including but not limited to the methods of selecting a transform described in greater detail below with respect to FIGS. 4 and 5. As one example, transform processing unit 52 and inverse transform unit 60 may be configured to perform any or all of the techniques described in this disclosure. In another embodiment, the encoder 20 includes an optional inter-layer prediction unit 66 that is configured to perform any or all of the techniques described in this disclosure. In other embodiments, inter-layer prediction can be performed by mode selection unit 40, in which case the inter-layer prediction unit 66 may be omitted. However, aspects of this disclosure are not so limited. In some examples, the techniques described in this disclosure may be shared among the various components of video encoder 20. In some examples, in addition to or instead of, a processor (not shown) may be configured to perform any or all of the techniques described in this disclosure.

Video encoder 20 may perform intra-, inter-, and inter-layer prediction (sometime referred to as intra-, inter- or inter-layer coding) of video blocks within video slices. Intra coding relies on spatial prediction to reduce or remove spatial redundancy in video within a given video frame or picture. Inter-coding relies on temporal prediction to reduce or remove temporal redundancy in video within adjacent frames or pictures of a video sequence. Inter-layer coding relies on prediction based upon video within a different layer(s) within the same video coding sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes mode select unit 40, reference frame memory 64, summer 50, transform processing unit 52, quantization unit 54, and entropy encoding unit 56. Mode select unit 40, in turn, includes motion compensation unit 44, motion estimation unit 42, intra-prediction unit 46, inter-layer prediction unit 66, and partition unit 48.

For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization, etc.). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra, inter, or inter-layer prediction mode, e.g., based on error results, and provide the resulting intra-, inter-, or inter-layer coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference frame memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference frame memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In some embodiments, motion estimation unit 42 can perform motion estimation relative to luma components, and motion compensation unit 44 can use motion vectors calculated based on the luma components for both chroma components and luma components. Mode select unit 40 may generate syntax elements associated with the video blocks and the video slice for use by video decoder 30 in decoding the video blocks of the video slice.

Intra-prediction unit 46 may intra-predict or calculate a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

The video encoder 20 may include an inter-layer prediction unit 66. Inter-layer prediction unit 66 is configured to predict a current block (e.g., a current block in the EL) using one or more different layers that are available in SVC (e.g., a base or reference layer). Such prediction may be referred to as inter-layer prediction. Inter-layer prediction unit 66 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information of the base layer to predict motion in the enhancement layer. Inter-layer residual prediction uses the residue of the base layer to predict the residue of the enhancement layer.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. For example, discrete sine transforms (DST), wavelet transforms, integer transforms, sub-band transforms or other types of transforms can also be used. In one embodiment, the transform processing unit 52 selects the transform based upon characteristics of the residual block. For example, the transform processing unit 52 may select the transform based upon a transform unit size and the color component type of the block being coded (e.g., luma, chroma). The transform processing unit 52 can perform the methods described below with respect to FIGS. 4 and 5.

Transform processing unit 52 can apply the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain (e.g., for later use as a reference block). Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

Video Decoder

Figure 3:
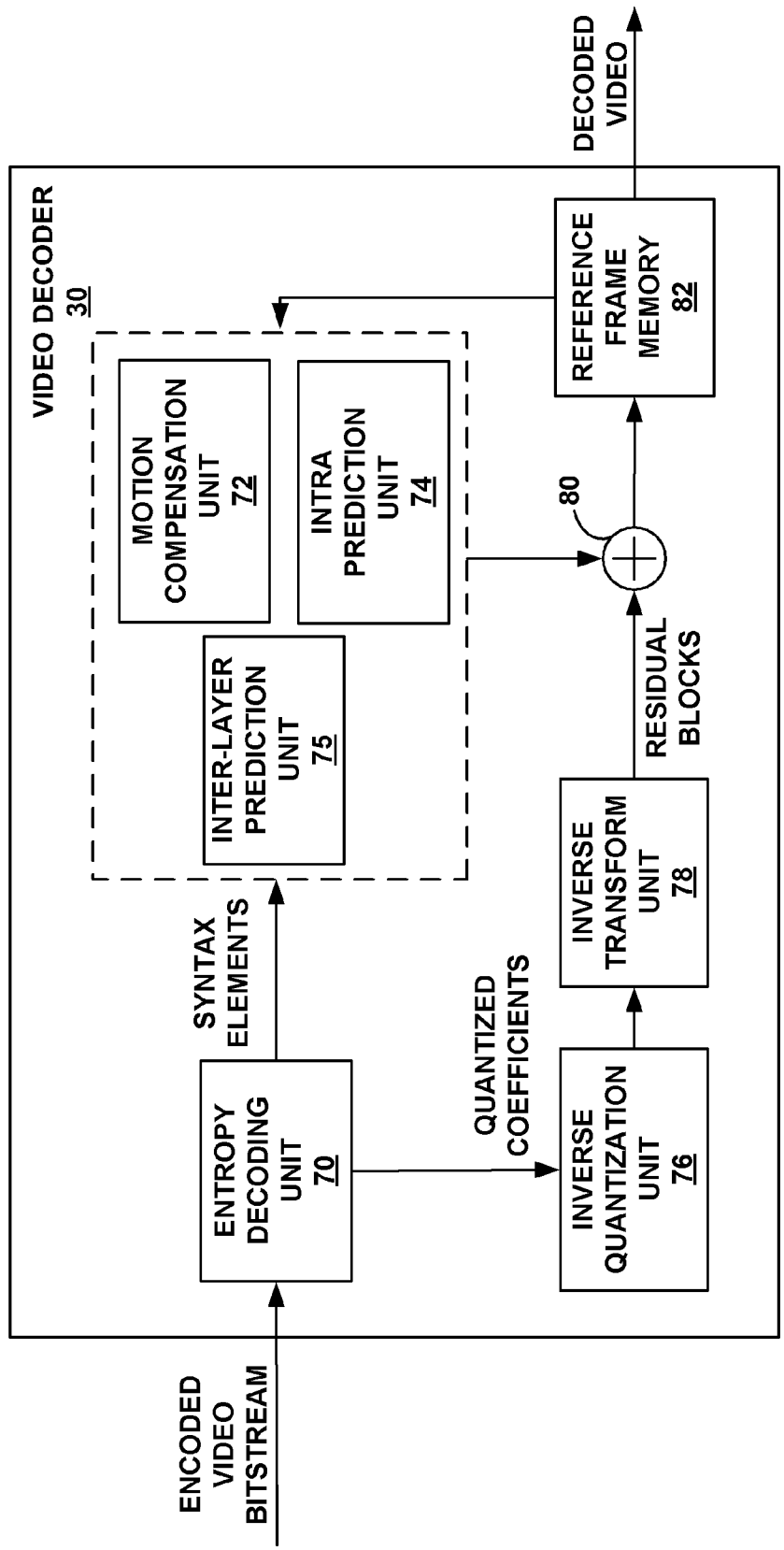
FIG. 3 is a block diagram illustrating an example of a video decoder that may implement techniques in accordance with aspects described in this disclosure.

FIG. 3 is a block diagram illustrating an example of a video decoder that may implement techniques in accordance with aspects described in this disclosure. Video decoder 30 may be configured to perform any or all of the techniques of this disclosure, including but not limited to the methods of selecting a transform described in greater detail below with respect to FIGS. 4 and 5. As one example, inverse transform unit 78 may be configured to perform any or all of the techniques described in this disclosure. However, aspects of this disclosure are not so limited. In some examples, the techniques described in this disclosure may be shared among the various components of video decoder 30. In some examples, in addition to or instead of, a processor (not shown) may be configured to perform any or all of the techniques described in this disclosure.

In the example of FIG. 3, video decoder 30 includes an entropy decoding unit 70, motion compensation unit 72, intra prediction unit 74, inter-layer prediction unit 75, inverse quantization unit 76, inverse transformation unit 78, reference frame memory 82 and summer 80. In some embodiments, motion compensation unit 72 and/or intra prediction unit 74 may be configured to perform inter-layer prediction, in which case the inter-layer prediction unit 75 may be omitted. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (e.g., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference frame memory 92. Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Video decoder 30 may also include an inter-layer prediction unit 75. The inter-layer prediction unit 75 is configured to predict a current block (e.g., a current block in the EL) using one or more different layers that are available in SVC (e.g., a base or reference layer). Such prediction may be referred to as inter-layer prediction. Inter-layer prediction unit 75 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information of the base layer to predict motion in the enhancement layer. Inter-layer residual prediction uses the residue of the base layer to predict the residue of the enhancement layer. Inverse quantization unit 76 inverse quantizes, e.g., de-quantizes, the quantized transform coefficients provided in the bitstream and decoded by entropy decoding unit 70. The inverse quantization process may include use of a quantization parameter QPY calculated by video decoder 30 for each video block in the video slice to determine a degree of quantization and, likewise, a degree of inverse quantization that should be applied.

Inverse transform unit 78 applies an inverse transform, e.g., an inverse DCT, an inverse DST, an inverse integer transform, or a conceptually similar inverse transform process, to the transform coefficients in order to produce residual blocks in the pixel domain. In one embodiment, the inverse transform unit 78 selects the particular transform to apply based upon one or more characteristics of the video information being decoded. For example, the inverse transform unit 78 may select the transform based upon the transform unit size and color component type of the video information. The inverse transform unit 78 can perform the methods described in greater detail below with respect to FIGS. 4 and 5.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 92, which stores reference pictures used for subsequent motion compensation. Reference frame memory 82 also stores decoded video for later presentation on a display device, such as display device 32 of FIG. 1.

Intra-BL Transform Selection

In SVC, a mode referred to as Intra-BL (or Texture-BL) is a video coding mode in which base layer reconstructed pixels are used to predict the value of a current enhancement layer block. The Intra-BL mode may be applied at the coding unit (CU) or prediction unit (PU) level. For example, a flag signaled at CU or PU level can be used to indicate when such mode is to be used.

As discussed above, in HEVC, DST and DCT transforms can be applied to residual information. For example, a DST 4×4 may be applied to 4×4 transform units (TU) (e.g., TUs having a size of 4 pixels by 4 pixels) for luma blocks coded with Intra prediction regardless of the particular intra direction. A DCT transform is used for bigger TUs, blocks coded in Inter mode, and chroma residual.

In U.S. Application No. 61/699,120 filed Sep. 10, 2012, which is incorporated herein by reference in its entirety, certain implementations of switching between DCT and DST transforms are described. The present disclosure provides particular implementations regarding how a transform can be selected and applied for Intra-BL mode coded video information.

In one embodiment, when encoding or decoding video in Intra-BL mode, the selection between a first transform and a second transform (e.g., DST or DCT) can depend upon both transform unit (TU) size and color component type of the video information being coded. For example, a DST 4×4 can be applied for the 4×4 luma TUs of an Intra-BL predicted block, and a DCT can be applied for chroma residual and luma TUs that are larger than 4×4 in size. In this implementation, advantageously, no new core is introduced for luma intra predicted blocks in the existing HEVC implementation.

Additionally, in another embodiment, switching or selecting transform based upon luma TU size for Intra-BL mode (e.g., using DST 4×4 for 4×4 luma TUs and DCT for chroma and bigger luma TUs) can be applied only if DST is used to transform 4×4 luma TUs in other intra prediction modes, as is the case for HEVC. For example, if a DST is not applied for other intra modes and all intra directions, then DST may not be used for 4×4 luma TUs of Intra-BL mode coded blocks. In this embodiment, a DCT can be used for 4×4 luma TUs of Intra-BL mode coded blocks instead of a DST.

Alternatively or additionally, the DST transform in the above examples can be used to transform I-slices and DCT can be used to transform non I-slices (such as P or B slices). For example, a DST 4×4 transform can be used with 4×4 luma TUs where prediction is performed according to the Intra-BL mode only for I-slices; for other slices, chroma blocks and bigger luma TUs, DCT can be used.

In addition, transform coefficients obtained from any of the above transform selection and usage methods (or similar such methods) can be coded using existing transform coefficients coding methods. For example, transform coefficients may be coded using significance map coding, level coding and/or context modeling, as is used for other prediction modes, such as for the TUs of intra predicted blocks.

In addition, although the techniques described above have described transform selection based on whether the luma TU size is 4×4, other luma TU sizes may be used. For example, the same methods can be applied based upon other TU size thresholds. For example for transform selection may be based upon whether the luma TU is larger than 4×4 (e.g., 8×8 luma TU) or smaller than 4×4 (e.g., 2×2 luma TU). Additionally, the same or a similar technique can be applied for chroma blocks. For example, when coding video information according to Intra-BL mode, a first transform (e.g., DST, etc.) may be selected if the chroma TU is a threshold size (e.g., 4×4, etc.), and a second transform (e.g., DCT, etc.) may be selected if the chroma TU size is greater than the threshold size or if the color component type is luma (or any size TU).

In addition, if other intra prediction modes are introduced for HEVC or other video codec extensions in the future, for example combined intra mode or others, the same transform selection methods (e.g., usage of DST and DCT transforms described for Intra-BL mode) above can be used. The methods mentioned above can be applied for other types of DCT or DST as well as for any other type of transforms, not necessarily limited to those discussed above.

Figure 4:
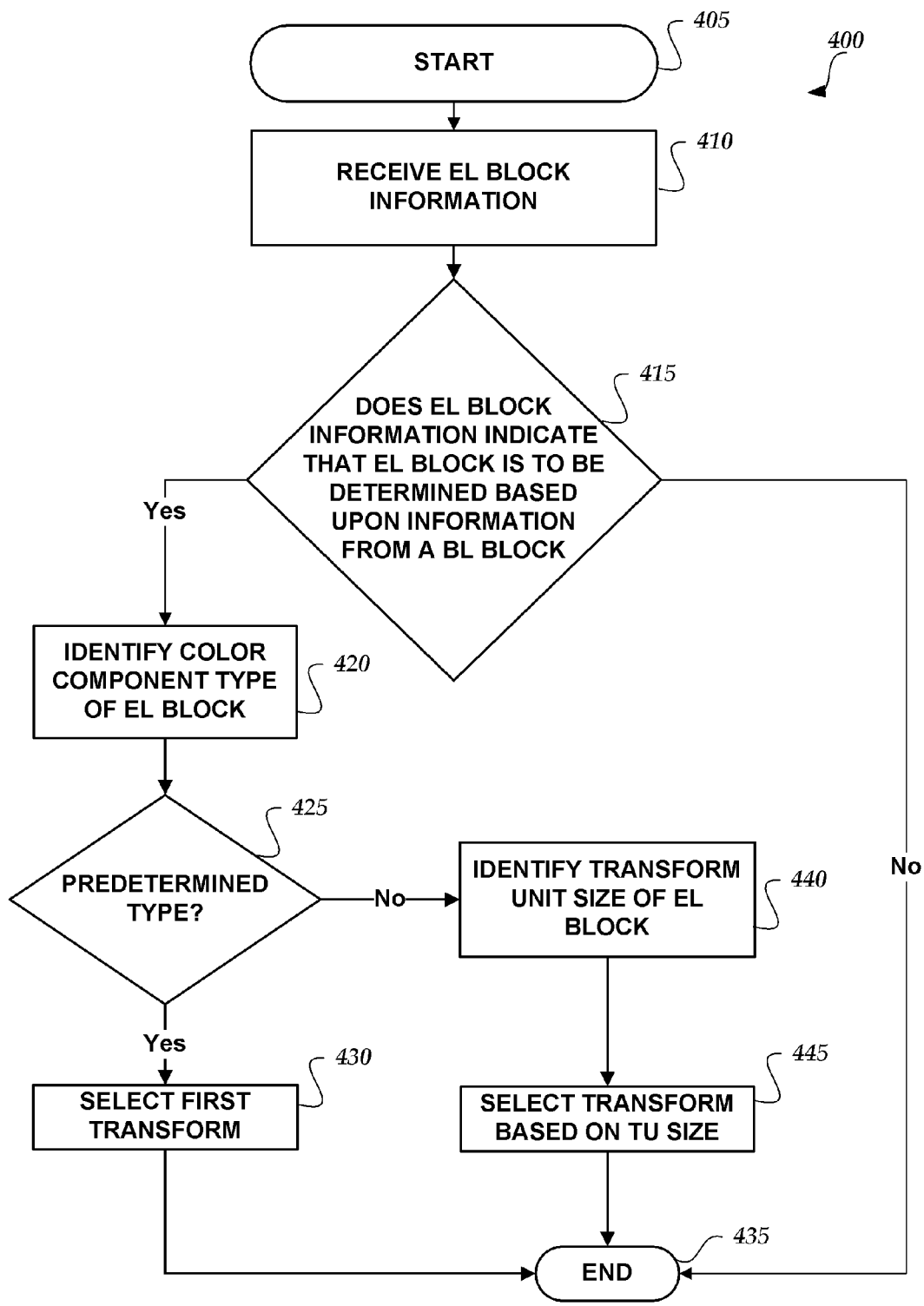
FIG. 4 is a flowchart illustrating an embodiment of a method for selecting a video coding transform according to aspects of this disclosure

FIG. 4 illustrates one embodiment of a method of selecting a transform that may be performed by the video encoder 20 of FIG. 2 or the video decoder 30 of FIG. 3. The method 400 begins at block 405. At block 410, enhancement layer (EL) block information is received. For example, the video encoder 20 or video decoder 30 may receive and store video information in a memory. At block 415, it is determined whether the EL block information indicates that the EL block is to be determined based upon information from a base layer (BL) block. For example, at block 415 it is determined whether the EL block is to be coded according to Intra-BL mode. If yes, the method 400 proceeds to block 420; if not, the method 400 ends at block 435.

At block 420 a color component type of the EL block is identified. For example, it is determined whether the EL block being coded is luma information or chroma information. The method 400 then proceeds to block 425. At block 425 it is determined whether the color component type is a predetermined type. If yes, the method 400 continues to block 430; if not, the method 400 continues to block 440. At block 430, a first transform is selected. The method 400 then ends at block 435.

At block 440, a transform unit size of the EL block is identified. At block 445, the transform is selected based on the TU size. For example, if the TU size is less than, is greater than, or is unequal to a predetermined threshold size (e.g., 2×2, 4×4, 8×8, etc.), the first transform may be selected; otherwise, a second transform is selected. The method 400 may optionally include coding (e.g., encoding or decoding) the video information using the selected transform. Otherwise, the method 400 proceeds to block 435, where the method 400 ends.

Figure 5:
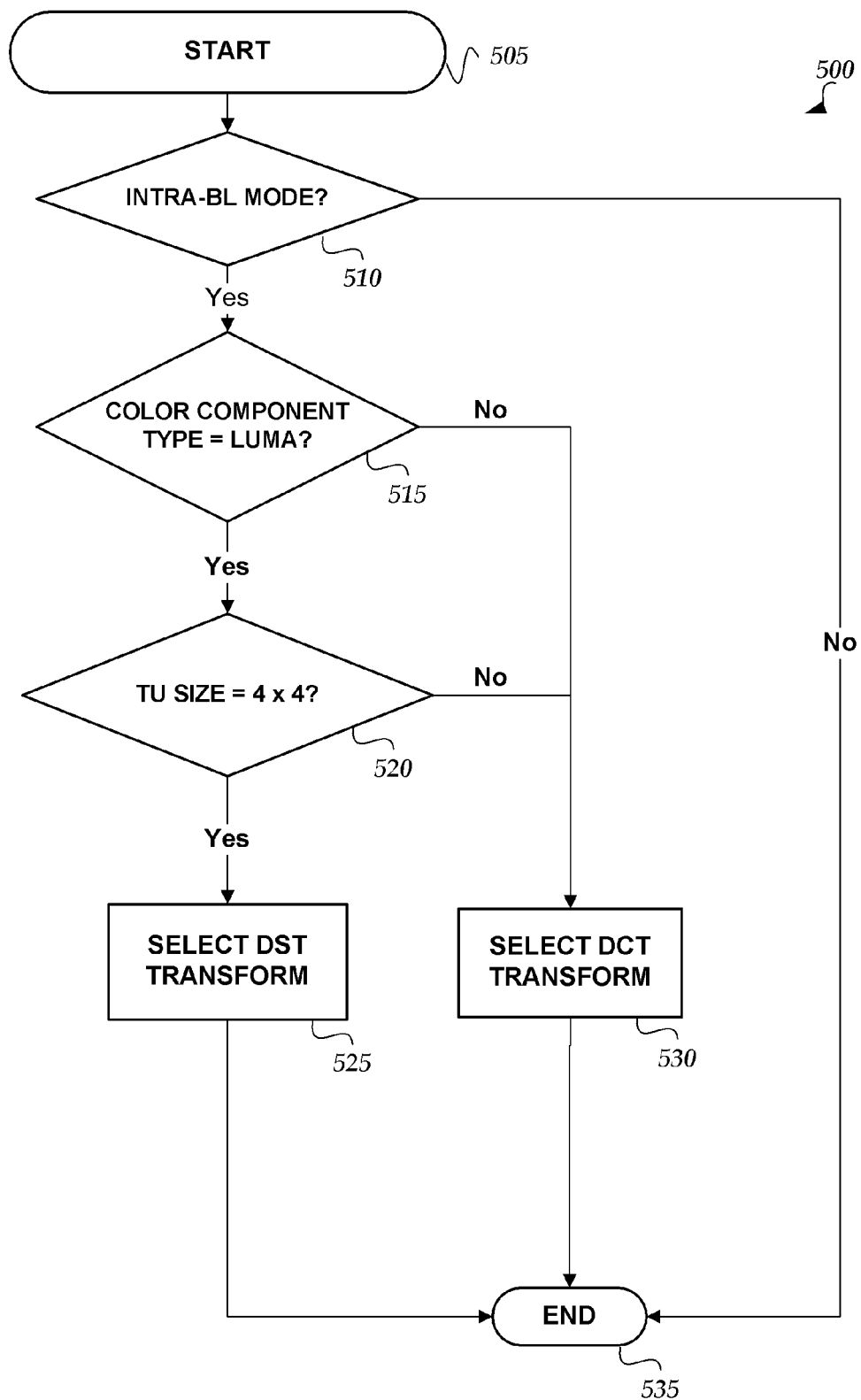
FIG. 5 is a flowchart illustrating another embodiment of a method for selecting a video coding transform according to aspects of this disclosure.

FIG. 5 illustrates another embodiment of a method of selecting a transform that may be performed by the video encoder 20 of FIG. 2 or the video decoder 30 of FIG. 3. The method 500 begins at block 505. At block 510, it is determined whether video information being coded is to be coded according to an Intra-BL mode. If yes, the method 500 continues to block 515; if not, the method 500 continues to block 535 and ends.

At block 515, it is determined whether the color component type of the video information being coded is lumen. If yes, the method 500 continues to block 520; if not, the method 500 continues to block 530. At block 520, it is determined whether the transform unit size of the video information being coded is 4×4. If yes, the method 500 continues to block 525; if not, the method 500 continues to block 530.

At block 525, a DST transform is selected. At block 530 a DCT transform is selected. The method 500 may optionally include coding (e.g., encoding or decoding) the video information using the selected transform. Otherwise, the method 500 may then proceed from block 525 or block 530 to block 535, where the method 500 ends.

While the above disclosure has described particular embodiments, many variations are possible. For example, as mentioned above, the above techniques may be applied to 3D video encoding. In some embodiments of 3D video, a reference layer (e.g., a base layer) includes video information sufficient to display a first view of a video and the enhancement layer includes additional video information relative to the reference layer such that the reference layer and the enhancement layer together include video information sufficient to display a second view of the video. These two views can used to generate a stereoscopic image. As discussed above, motion information from the reference layer can be used to identify additional implicit hypothesis when encoding or decoding a video unit in the enhancement layer, in accordance with aspects of the disclosure. This can provide greater coding efficiency for a 3D video bitstream.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. An apparatus for coding video information, the apparatus comprising:
a memory configured to store video information associated with a base layer and an enhancement layer; and
a processor operationally coupled to the memory and configured to, in response to determining that the video information associated with the enhancement layer is to be determined based upon the video information associated with the base layer, select between a discrete sine transform and a discrete cosine transform based at least in part on at least one of a transform unit (TU) size or a color component type of the video information associated with the enhancement layer, wherein the processor is further configured to select the discrete sine transform in response to determining that the discrete sine transform is to be used to transform other video information having the same TU size and the same color component type as the video information associated with the enhancement layer in an intra prediction mode other than Intra-BL mode.

2. The apparatus of claim 1, wherein the processor is configured to select the discrete sine transform when the TU size is 4×4 and the color component type is luma.

3. The apparatus of claim 1, wherein the processor is configured to select the discrete cosine transform when the color component type is chroma.

4. The apparatus of claim 1, wherein the processor is configured to select the discrete cosine transform when the TU size is larger than 4×4.

5. The apparatus of claim 1, wherein the processor is configured to select the discrete sine transform when the TU size is 4×4, the color component type is luma, and when the video information associated with the enhancement layer is part of an I slice.

6. The apparatus of claim 1, wherein the processor is further configured to select the discrete cosine transform when the TU size is not 4×4, the color component type is chroma, or when the video information associated with the enhancement layer is part of a non-I slice, a B slice or a P slice.

7. The apparatus of claim 1, wherein the processor is further configured to encode the video information associated with the enhancement layer using the selected discrete sine transform.

8. The apparatus of claim 1, wherein the processor is further configured to decode the video information associated with the enhancement layer using the selected discrete sine transform.

9. The apparatus of claim 1, wherein the apparatus is a device selected from the group consisting of: a desktop computer, a notebook computer, a tablet computer, a set-top box, a telephone handset, a smart phone, a smart pad, a television, a camera, a display device, a digital media player, a video gaming console, an in-car computer, and a video streaming device.

10. A method of decoding video information, the method comprising:
receiving video information associated with a base layer and an enhancement layer;
determining whether the video information associated with the enhancement layer is to be determined based upon the video information associated with the base layer;
in response to determining that the video information associated with the enhancement layer is to be determined based upon the video information associated with the base layer, selecting between a discrete sine transform and a discrete cosine transform based at least in part on at least one of a transform unit (TU) size or a color component type of the video information associated with the enhancement layer, wherein the selecting comprises selecting the discrete sine transform in response to determining that the discrete sine transform is to be used to transform other video information having the same TU size and the same color component type as the video information associated with the enhancement layer in an intra prediction mode other than Intra-BL mode; and decoding the video information associated with the enhancement layer using the selected discrete sine transform.

11. The method of claim 10, wherein the selecting comprises selecting the discrete sine transform when the TU size is 4×4 and the color component type is luma.

12. The method of claim 10, wherein the selecting comprises selecting the discrete cosine transform when the color component type is chroma.

13. The method of claim 10, wherein the selecting comprises selecting the discrete cosine transform when the TU size is larger than 4×4.

14. The method of claim 10, wherein the selecting comprises selecting the discrete sine transform when the TU size is 4×4, the color component type is luma, and when the video information associated with the enhancement layer is part of an I slice.

15. The method of claim 10, wherein the selecting comprises selecting the discrete cosine transform when the TU size is not 4×4, the color component type is chroma, or when the video information associated with the enhancement layer is part of a non-I slice, a B slice or a P slice.

16. A method of encoding video information, the method comprising:
receiving video information associated with a base layer and an enhancement layer;
determining whether the video information associated with the enhancement layer is to be determined based upon the video information associated with the base layer;
in response to determining that the video information associated with the enhancement layer is to be determined based upon the video information associated with the base layer, selecting between a discrete sine transform and a discrete cosine transform based at least in part on at least one of a transform unit (TU) size or a color component type of the video information associated with the enhancement layer, wherein the selecting comprises selecting the discrete sine transform in response to determining that the discrete sine transform is to be used to transform other video information having the same TU size and the same color component type as the video information associated with the enhancement layer in an intra prediction mode other than Intra-BL mode; and
encoding the video information associated with the enhancement layer using the selected discrete sine transform.

17. The method of claim 16, wherein the selecting comprises selecting the discrete cosine transform when the TU size is larger than 4×4.

18. The method of claim 16, wherein the selecting comprises selecting the discrete sine transform when the TU size is 4×4, the color component type is luma, and when the video information associated with the enhancement layer is part of an I slice.

19. The method of claim 16, wherein the selecting comprises selecting a discrete cosine transform when the TU size is not 4×4, the color component type is chroma, or when the video information associated with the enhancement layer is part of a non-I slice, a B slice or a P slice.

20. A non-transitory computer readable medium comprising code that, when executed, causes an apparatus to:
receive video information associated with a base layer and an enhancement layer;
determine whether the video information associated with the enhancement layer is to be determined based upon the video information associated with the base layer;
in response to determining that the video information associated with the enhancement layer is to be determined based upon the video information associated with the base layer, select between a discrete sine transform and a discrete cosine transform based at least in part on at least one of a transform unit (TU) size or a color component type of the video information associated with the enhancement layer, wherein the code further causes the apparatus to select the discrete sine transform in response to determining that the discrete sine transform is to be used to transform other video information having the same TU size and the same color component type as the video information associated with the enhancement layer in an intra prediction mode other than Intra-BL mode; and
code the video information associated with the enhancement layer using the selected discrete sine transform.

21. The medium of claim 20, wherein the code further causes the apparatus to select the discrete sine transform when the TU size is 4×4 and the color component type is luma.

22. The medium of claim 20, wherein the code further causes the apparatus to select the discrete cosine transform when the color component type is chroma.

23. An apparatus configured to code video information, the apparatus comprising:
means for receiving video information associated with a base layer and an enhancement layer;
means for determining whether the video information associated with the enhancement layer is to be determined based upon the video information associated with the base layer;
means for selecting between a discrete sine transform and a discrete cosine transform based at least in part on at least one of a transform unit (TU) size or a color component type of the video information associated with the enhancement layer in response to determining that the video information associated with the enhancement layer is to be determined based upon the video information associated with the base layer, wherein the means for selecting comprises means for selecting the discrete sine transform in response to determining that the discrete sine transform is to be used to transform other video information having the same TU size and the same color component type as the video information associated with the enhancement layer in an intra prediction mode other than Intra-BL mode; and
means for coding the video information associated with the enhancement layer using the selected transform.

24. The apparatus of claim 23, wherein the means for selecting comprises means for selecting the discrete sine transform when the TU size is 4×4 and the color component type is luma.

25. The apparatus of claim 23, the means for selecting comprises means for selecting a discrete cosine transform when the color component type is chroma.

* * * * *